US007660233B2

(12) United States Patent
Paden et al.

(10) Patent No.: US 7,660,233 B2
(45) Date of Patent: *Feb. 9, 2010

(54) REPORTING DIAL-UP ACCESS PROBLEMS USING A REAL-TIME AUTOMATED SYSTEM

(75) Inventors: Jonathan Paden, Austin, TX (US); Bobby Sams, Austin, TX (US); Dennis Collins, Hopewell Junction, NY (US)

(73) Assignee: AT&T Intellectual Property I, L.P., Reno, NV (US)

( * ) Notice: Subject to any disclaimer, the term of this patent is extended or adjusted under 35 U.S.C. 154(b) by 949 days.

This patent is subject to a terminal disclaimer.

(21) Appl. No.: 10/937,960

(22) Filed: Sep. 10, 2004

(65) Prior Publication Data

US 2006/0056287 A1   Mar. 16, 2006

(51) Int. Cl.
*G01R 31/08* (2006.01)
(52) U.S. Cl. ............... 370/216; 379/22.03; 379/207.15
(58) Field of Classification Search .................. None
See application file for complete search history.

(56) References Cited

U.S. PATENT DOCUMENTS

| | | | |
|---|---|---|---|
| 6,016,476 A * | 1/2000 | Maes et al. ................. 705/1 |
| 6,351,524 B1 * | 2/2002 | Schuster et al. .......... 379/88.23 |
| 6,556,659 B1 | 4/2003 | Bowman-Amuah | |
| 6,665,820 B1 | 12/2003 | Frowein et al. | |
| 6,973,575 B2 * | 12/2005 | Arnold ................ 713/186 |
| 7,054,427 B2 * | 5/2006 | Malik .................. 379/207.02 |
| 7,127,506 B1 * | 10/2006 | Schmidt et al. ............ 709/224 |
| 7,133,515 B1 * | 11/2006 | Cook .................... 379/208.01 |
| 7,346,152 B2 * | 3/2008 | Paden et al. ............. 379/88.16 |
| 2002/0032765 A1 | 3/2002 | Pezzutti | |
| 2003/0004751 A1 * | 1/2003 | Ng et al. .................... 705/2 |
| 2003/0097450 A1 * | 5/2003 | Ogg et al. ................. 709/227 |
| 2003/0135592 A1 | 7/2003 | Vetter et al. | |
| 2003/0182556 A1 * | 9/2003 | Sunder et al. ............. 713/176 |

* cited by examiner

*Primary Examiner*—Phuc Tran
(74) *Attorney, Agent, or Firm*—Ed Guntin; Andrew Gust; Akerman Senterfitt

(57) ABSTRACT

A method for reporting and responding to dial-up connectivity problems can include the step of establishing a voice connection between a caller and an automated response system. The caller can be automatically prompted for a dial-up access number that is problematic for the caller. A determination can be automatically made as to whether the received dial-up access number is valid. A potential problem can be automatically reported to a network operations center responsible for the access number via a data connection. The caller can be automatically presented with at least one alternative dial-up access number via the voice connection.

14 Claims, 3 Drawing Sheets

REPORTING DIAL-UP ACCESS PROBLEMS USING A REAL-TIME AUTOMATED SYSTEM

BACKGROUND

1. Field of the Invention

The present invention relates to the field of dial-up networking and, more particularly, to reporting problems with dial-up access numbers.

2. Description of the Related Art

Dial-up Internet users access the Internet by establishing a communication link between their home computer and a computing device of an Internet Service Provider (ISP). The communication link occurs across a phone line and is established when the user contacts the ISP computer device via one or more access telephone numbers. Generally, the user will be able to select one of many access number local to the user so that telephone usage charges are minimized.

It is not uncommon for dial-up users to experience problems when connecting to the Internet via an access number. One typical connectivity problem is an end user problem, meaning that the user is experiencing problems with their home computer, which results in the user being unable to establish a connection with the ISP computing device. Another reason that dial-up users are unable to connect to the Internet is that the access number that the user dialed is temporarily malfunctioning. ISPs often provide a means though which users can report problematic access numbers.

Conventional reporting mechanisms suffer one or more deficiencies, making conventional problem reporting inconvenient to dial-up users and/or expensive for the ISPs. One conventional problem reporting technique involves users contacting live ISP agents in a customer service center over a telephone line to report an access problem. It can be very expensive to staff a customer support center with live agents, so as a cost saving mechanism, such support centers are typically minimally staffed. Consequently, wait times for reporting dial-up connectivity problems can be painfully long for concerned users.

This is especially true since a real problem with a dial-up access number will affect a large user population at approximately the same time. A significant portion of these affected users will attempt to contact the customer support center, thereby overloading the call handling capabilities of the customer support center. Notably, the volume of calls received by the customer support center is unnecessary; as only a small number of calls need to be received before the ISP is apprised of the access number problem.

To combat the problem of live-agents being intermittently overloaded with calls, many ISPs have implemented automated response systems. Many of these automated systems are Web or e-mail based. Such systems can be effectively useless to users attempting to report connectivity problems because such problems are focused around to connect to the Internet. Consequently, a user experiencing a problem can lack access to the Web or e-mail based problem reporting tools.

Another automated reporting mechanism commonly used allows dial-up users to leave voice mail messages that contain problem report details. This reporting mechanism, however, generally provides insufficient guidance to the user concerning details necessary to aid the ISP in troubleshooting a problem. Specifically, voice mail reports leave out critical information such as the problematic access control number, the symptoms the user experienced (that allow the ISP to determine if the problem is an end-user problem or one related to an access number), or the like. Further, dial-up users are often unsatisfied with leaving a voice messages, as such systems provide inadequate feedback. Users reporting problems via a voice message, therefore, often report the same problem to a live customer service representative, when one is available; again resulting in a customer support center being overloaded with calls each time a dial-up access number malfunctions.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE INVENTION

The present invention discloses a system, a method, and an apparatus through which dial-up users can automatically report access problems in a manner useful for an Internet Service Provider (ISP). More specifically, an interactive telephone response system, such as an interactive voice response system (IVR), can handle problem reporting. The automated system can prompt users to enter an access number with which the user is experiencing problems. The received access number can be verified as valid by cross automatically referencing a database of valid access numbers. The user can then be prompted to input connectivity problem details that permit the ISP to target the cause of a problem.

When the input indicates a high likelihood that the user is having an end-user problem, that user can be provided with troubleshooting information and/or transferred to a technical support agent. When the input indicates a high likelihood that there is a problem with an access number, the automated system can determine one or more alternative access numbers local to the user. Then the automated system can present the user with a list of these numbers, thereby allowing the user to connect to the internet via a new dial-up number until the problem with the originally attempted number is resolved. Further, the problem reported to the automated system can be conveyed to a network operations center (NOC) to place a technician on notice of the suspected access number problem. The technician can responsively take a corrective action to restore the problematic access number to service. In one embodiment, the NOC can include automated problem identification and/or problem solving hardware or software that, can be initiated upon receipt of the problem report.

Figure 1:
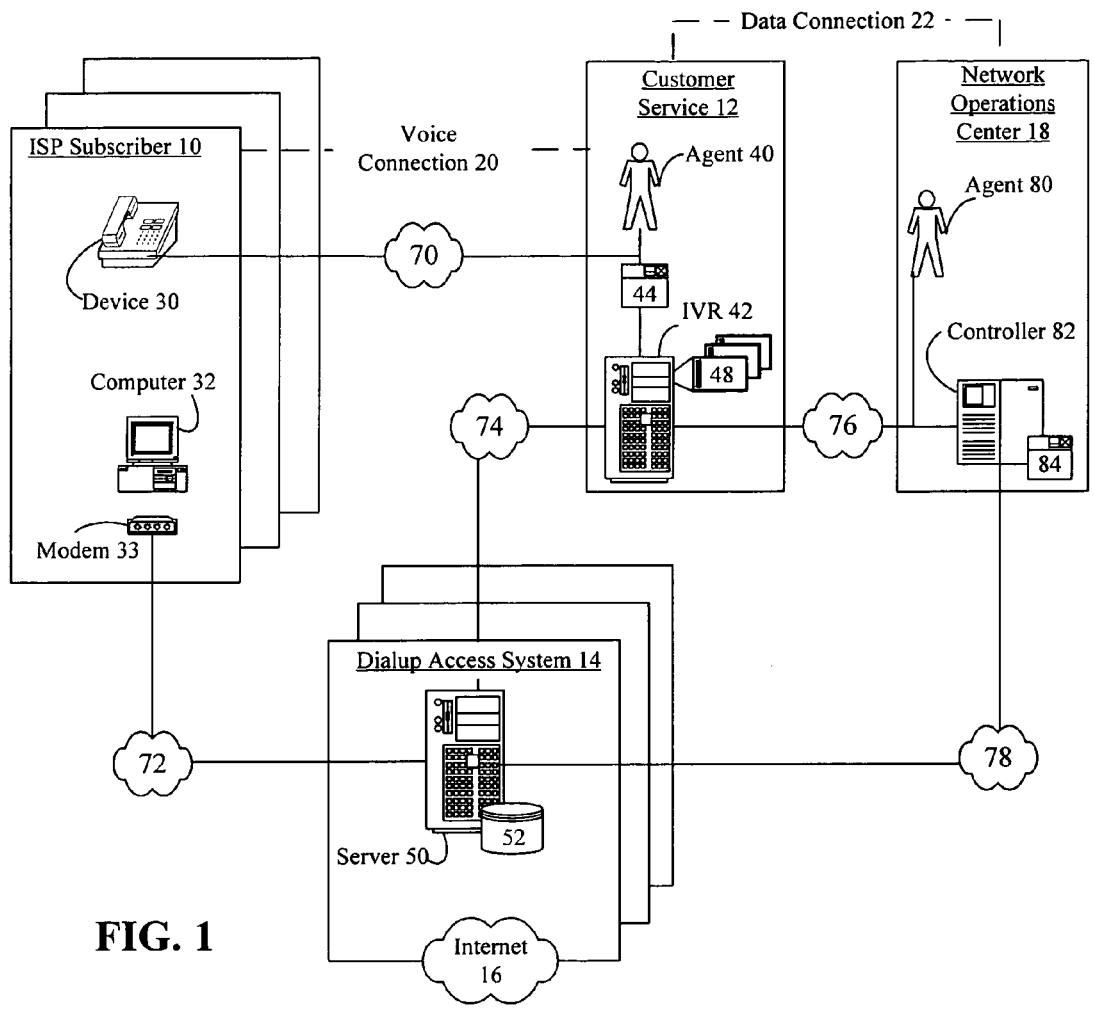
FIG. 1 is a schematic diagram illustrating an automated system for reporting dial-up connectivity problems in accordance with one embodiment of the invention.

FIG. 1 is a schematic diagram illustrating an automated system 100 for reporting dial-up connectivity problems in accordance with one embodiment of the invention. The system 100 can include ISP subscribers 10, a customer service center 12, a NOC 18, and a dialup access system 14. The dialup access system 14 can grant Internet 16 access to the ISP subscribers 10. Typically, a computer 32 attached to a modem 33 will communicatively link to a server 50 across network 72. The server 50 will provide network connective using one or more ports, each port being associated with one or more dialup access numbers. Dialup account information contained in data store 52 can be used by the dialup access system 14 to ascertain an access account of the ISP subscriber 10 and to provide account authorization.

The customer service center 12 can receive ISP subscriber 10 calls pertaining to access problems and can help the ISP subscriber 10 re-establish dial-up service. The customer service center 12 can include a customer service agent 40 and an interactive voice response system (IVR) 42 that interfaces with the ISP subscriber through interface 44. The IVR 42 can be directly linked to the server 50 via network 74. Through this link, the IVR 42 can access information contained in the data store 52.

The IVR 42 can be a system that accepts a combination of voice telephone input and/or touch-tone keypad input and provides appropriate feedback in the form of voice, fax, callback, e-mail, as well as other suitable media. In one embodiment, IVR 42 can be a part of a larger application that includes database access, such as a customer service database (not shown) that can be included within the customer service center 12. Notably, the IVR 42 can enter a dialogue with the ISP subscriber 10 in real-time. The dialogue can be controlled using a series of pre-established menus 48.

Additionally, the customer service center 12 can be communicatively linked to the NOC 18 via a data connection 22. More specifically, the IVR 42 can be communicatively linked to the controller 82 via network 76. The NOC 18 can be a center that provides technical support for one or more dial-up access numbers. That is, the NOC 18 provides a support infrastructure that permits the dialup access system 14 to function. The NOC 18 can include one or more live agents 80 and a network controller 82.

The network controller 82 can be one or more communicatively linked computer devices and peripherals that collectively maintain, monitor, and analyze hardware, software, and communication links associated with the dialup access system 14. That is, problem reports generated by the IVR 42 can be conveyed to the network controller 82 in real-time. The network control 82 can responsively initiate a programmatic action in response. For example, the network control 82 can notify an agent 80 of the potential access number problem.

In one embodiment, the NOC 18 can receive problem indications from a multiple sources. These sources can include network monitoring software 84, agents 80, and the user problem reports received via the IVR 42 and/or a customer service agent 40. The monitoring software 84 can monitor the dialup access system 14 across network 78. The NOC 18 can correlate and combine data from each of these sources to determine a likelihood that a problem exists. Different actions can be taken based upon the likelihood score and/or the criticality of reported problems.

As used herein, voice link 20 can be a standard public switched telephone network (PSTN) connection, which is typically a circuit-switched connection. The voice link 20 is not limited in this regard, however, and a packet-based connection that utilizes a technology like Voice over Internet Protocol (VoIP) can also form the voice link 20. The data link 22 can be any communication link capable of digitally conveying information.

Accordingly, networks 70, 72, 74, 76, 78, and 16 can be implemented as any of a variety of fashions so long as content is conveyed using encoded electromagnetic signals. Further, any of a variety of communication devices, such as customer premise equipment (CPE), computers, modems, routers, switches, or the like, can be included within networks 70, 72, 74, 76, 78, and 16.

Each of the networks 70, 72, 74, 76, 78, and 16 can convey content in a packet-based or circuit-based manner. Additionally, each of the networks 70, 72, 74, 76, and 78 can convey content via landlines or wireless data communication methods. For example, each of the networks 70, 72, 74, 76, and 78 can separately include an Intranet, a local area network, a wide area network, or a combination thereof. In another example, each of the networks 70, 72, 74, 76, and 78 can include a telephony network, like a mobile wireless network or a public switched telephone network (PSTN).

It should be appreciated that the arrangements shown in FIG. 1 are for illustrative purposes only and that the invention is not limited in this regard. The functionality attributable to the various components can be combined or separated in different manners than those illustrated herein. For instance, the network operations center 18 can be integrated with the dialup access system 14 in one embodiment.

Figure 2:
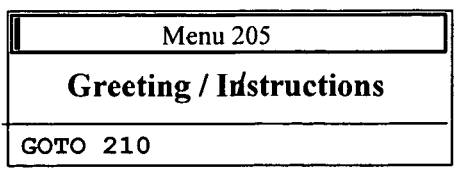
FIG. 2 is a menu structure used by an automated system that reports potential dial-up access number problems to a network operations center based upon caller information in accordance with one embodiment of the invention.
Figure 2:
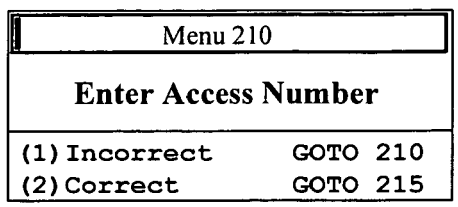
Figure 2:
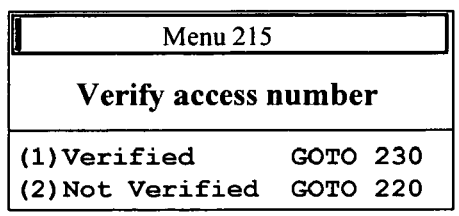
Figure 2:
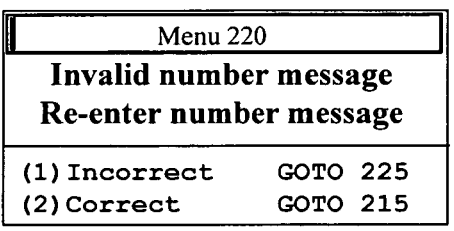
Figure 2:
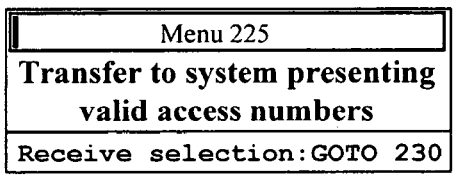
Figure 2:
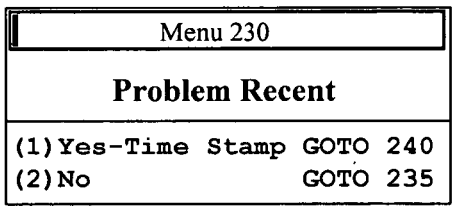
Figure 2:
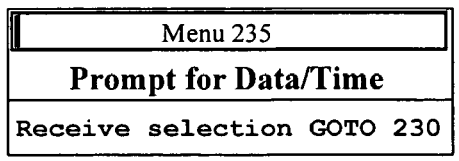
Figure 2:
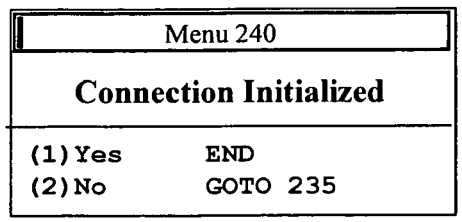
Figure 2:
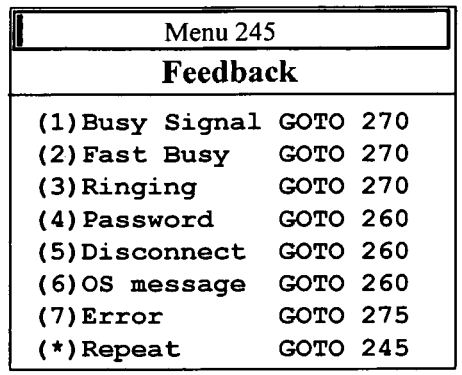
Figure 2:
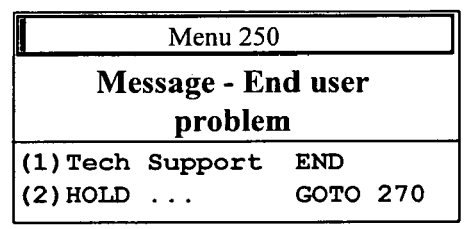
Figure 2:
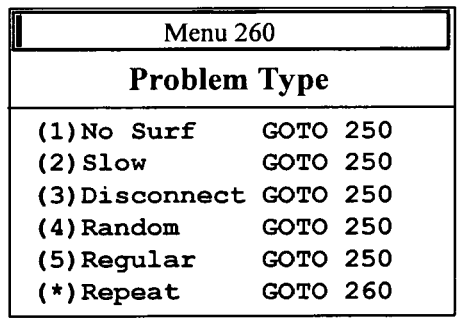
Figure 2:
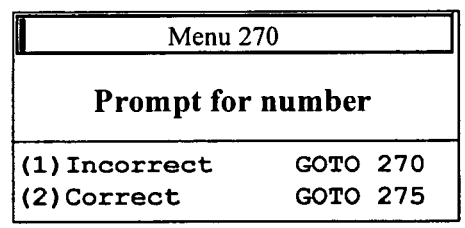
Figure 2:
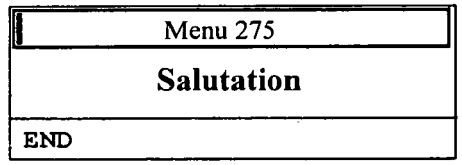

FIG. 2 is a menu structure 200 used by an automated system that reports potential dial-up access number problems to a network operations center based upon caller information in accordance with one embodiment of the invention. The menu structure 200 can be utilized in the context of any of a variety automated systems. For example, the menu structure 200 can be utilized in the context of system 100 of FIG. 1, where the menus 205-275 can be represented by menus 48 of FIG. 1.

The menu structure 200 can begin with menu 205. Menu 205 can present a greeting and provide instructions to the user concerning the manner in which the user is to select menu options. In one embodiment, the user can be allowed to input responses via voice responses and/or Dual Tone MultiFrequency (DTMF) keypad responses. The menu 205 can also provide system configuration prompts (not shown), that configure the menu structure 200 for a particular caller. For example, system configuration prompts can prompt a user to select a language for the menu prompts of menu structure 200.

Menu 210 can prompt a user to enter an access number that the user believes to be problematic. If no response is provided or if the response does not appear to be in a proper format for an access number, the structure can loop to menu 210. When a phone number capable of being an access number has been entered, the structure can proceed to menu 215.

In menu 215, an access number can be compared against a database of valid access numbers. When the access number matches a number in the database, the structure can jump to menu 230. When the access number does not match a number in the database, the structure can continue to menu 220. Menu 220 can present a message indicating the entered number is invalid and/or no longer in server. A user can then be prompted to re-enter an access number. When a validly formatted number is entered, the structure can loop to menu 215. When a correctly formatted input is not received, the structure can proceed to menu 225.

In menu 225, the user can be transferred to a system that presents a list of valid access numbers from which the user can make a selection. In one embodiment, the list can be limited to only those numbers local to the user, as determined by automatic number identification (ANI) information, by the area code of an incorrectly entered access number, or by any other suitable number limiting criteria.

In menu 230, a user can be prompted as to whether the problem being reported has recently occurred (such as within the last hour). If so, a time stamp of the current time can be automatically recorded and used as a time of problem occurrence. The structure can then proceed to menu 240. If the problem has not recently occurred, the structure can progress to menu 235. In step 235, a user can be prompted for a date and time of the problem.

In menu 240, a user can be prompted for whether the user was able to initialize a connection to determine if an error was subsequent to connectivity establishment. When a user response indicates that the user was unable to connect to the dial-up service, the structure can progress to menu 245. When the user response indicates that the problem occurred subsequent to a connection, the user can be informed that the problem experienced was not a network problem relating to the input access number.

In menu 245, a user can be asked for feedback concerning activities that occurred when the user attempted to connect. Specifically, the user can be asked whether (1) a busy signal was received (2) a fast busy signal was received, (3) if the number rang repeatedly but does not connect, (4) whether the user was repeatedly asked for a password, (5) whether the user was disconnected while the password was being verified, (6) whether they received an operating system error message, such as error 630, 636, 676, 690, etc., (7) whether a connection was initiated and then subsequent errors occurred, and (*) repeat choices. In one embodiment, a busy signal and/or a fast busy signal can be audibly presented when option (1) and (2) above are presented. When options (1), (2), or (3) are selected, the structure can proceed to menu 270. When option (4), (5), or (6) are selected, the structure can proceed to menu 260. When option (7) is selected, the structure can proceed to menu 275. When option (*) is selected, the structure can loop to menu 245.

In menu 250, a message can be presented stating something to the effect of "Please note that the symptom you selected may not always reflect network problems. If you chronically experience this problem, you may wish to be transferred to a technical support representative. Otherwise please hold." If an option for a technical support representative is selected, the user can be transferred to such a representative. Otherwise, after a designated hold time, the structure can proceed to menu 270.

In menu 260, a prompt can what problem a user experiences after being initially connected. Specifically, the user can be asked (1) if the user can connect but cannot surf the web, (2) if the performance is slow, (3) if the user is disconnected within 5 minutes of connecting, (4) if the user is disconnected at random times while actively using the dial-up service, (5) whether the user is disconnected at regular intervals, and (*) repeat choices. The response can be recorded and the structure can loop to menu 250.

In menu 270, the user can be prompted for a telephone number from which the computer dials. When a validly formatted telephone number is entered, the structure can proceed to step 275. When no validly formatted telephone number is entered then the structure can loop to menu 270. In menu 275, a message thanking the user for reporting the problem can be presented. Further, the message of menu 275 can detail the reported problem, indicate whether feedback will be provided to the customer at a later time, or the like. After menu 275, the structure can end (meaning a call with the user can be terminated.)

Figure 3:
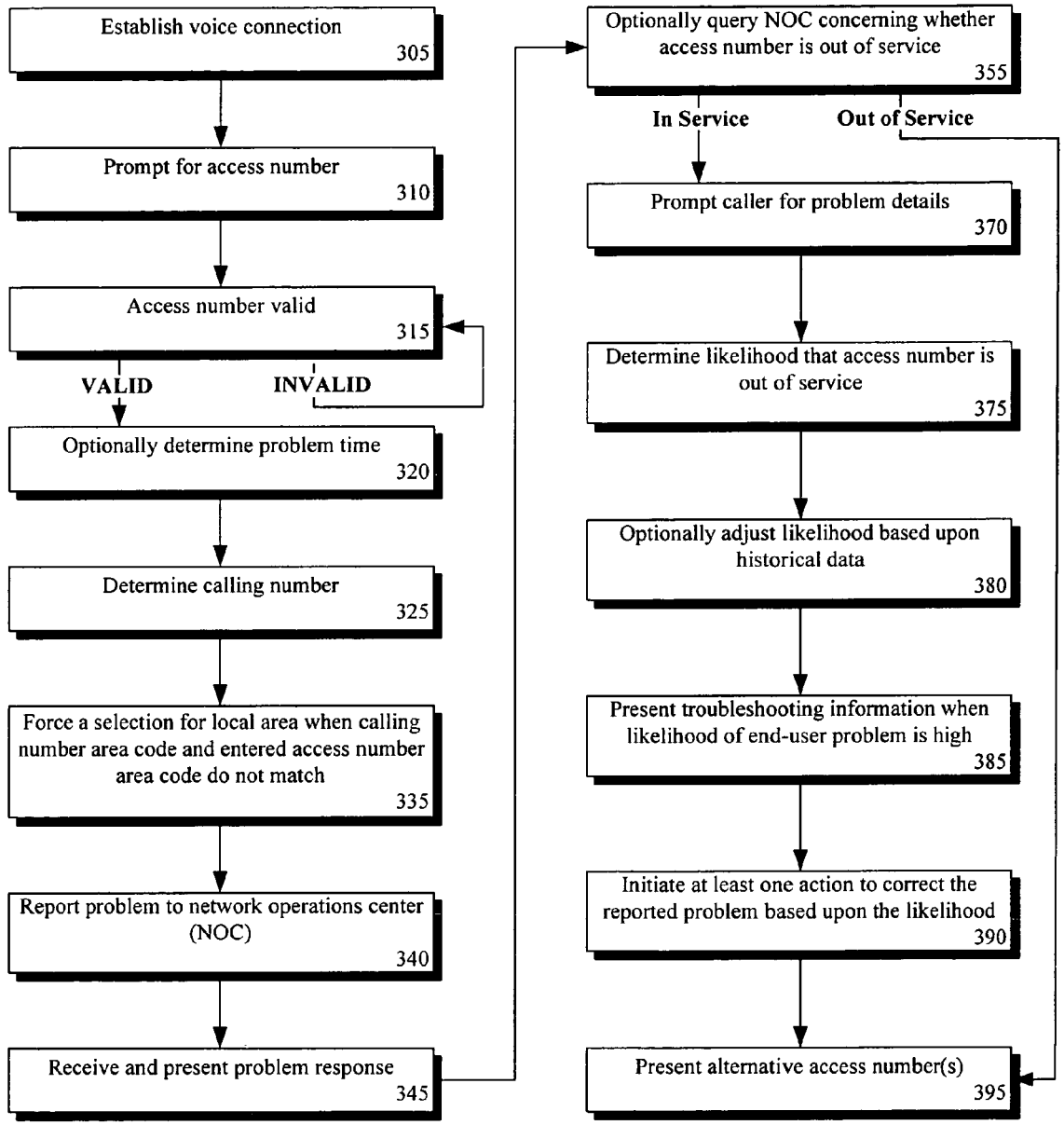
FIG. 3 is a flow chart illustrating a method for reporting and responding to dial-up connectivity problems in accordance with one embodiment of the invention.

FIG. 3 is a flow chart illustrating a method for reporting and responding to dial-up connectivity problems in accordance with one embodiment of the invention. The method 300 can be performed in the context of any of a variety of automated systems having problem reporting capabilities. For example, the method 300 can be performed in the context of system 100 of FIG. 1.

The method 300 can begin in step 305, where a voice connection can be established between a caller and an automated response system. In step 310, the caller can be prompted for a dial-up access number that is problematic for the caller. In step 315, a determination can be made as to whether the received dial-up access number is valid. For example, the input dial-up access number can be compared against a data store of valid dial-up numbers. When the access number is invalid the method can loop to step 310 where the caller can be re-prompted for an access number.

In step 320, a problem occurrence time can be optionally determined. In one embodiment, the caller can be explicitly prompted for a time. In another embodiment, the problem occurrence time can be assumed to be proximate to the reporting time, and a time stamp can be automatically taken, which is used as the problem occurrence time. In one embodiment, when the problem occurrence time indicates that the reported problem has already been resolved, the caller can be so informed and the method can end. Optionally, the user can be asked to re-report the problem should the problem still exist for the user.

In step 325, a calling number can be determined using automatic number identification (ANI) information. In step 335, the area code within the ANI information can be compared against the area code of the problematic access number. When calling number and area code for entered dial-up number do not match, the caller can be prompted to select one or the other for purposes of determining local alternative dial-up numbers.

In step 340, a potential problem can be reported to a network operations center (NOC) responsible for the access number via a data connection. The NOC can responsively take one or more suitable actions. For example, a technician can be dispatched to inspect the reported access number. In step 345, a problem response can be received from the NOC and presented the response to the caller. In step 355, the NOC can be optionally queried to determine whether the received dial-up number is out of service. For example, the NOC can include network monitoring hardware/software that can be automatically activated to confirm the dial-up number status. The NOC can also be communicatively linked to numerous reporting systems other than the one described by method 300 that can be used to confirm the reported problem. When the NOC determines the access number is out of service, the method can proceed directly to step 395.

In step 370, the caller can be prompted for problem details via the voice connection. Responses to the prompts can be reported to the NOC via the data connection In step 375, a likelihood that the received dial-up access number is out of service can be determined. Appreciably, the likelihood can alternatively indicate that the caller is probably experiencing an end user problem instead of a problem existing with the access number. In step 380, historic data can be optionally searched for other calls by the caller. The likelihood score can be adjusted based upon data retrieved by the search. This step can be used to "reward" callers that have historically provided accurate problem information and to "punish" callers that have historically reported inaccurate information.

In step 385, when the likelihood score indicates that the caller is experiencing an end user problem, the caller can be presented with troubleshooting information relating to at least one end user problem. The presenting of troubleshooting information can includes an option for the caller to speak with a live agent. In step 390, at least one action to correct the potential problem with the reported dial-up access number can be initiated based upon the likelihood. For example, when the likelihood is high that an access number is out of service, a service repair order can be issued. When the likelihood is low, no action may be merited as this time. In step 395, the caller can be presented with at least one alternative dial-up access number via the voice connection. The caller can then be thanked and the method 300 can end.

The steps detailed within method 300 represent one illustrative embodiment of the inventive arrangements disclosed herein. The scope of the invention is to be construed as including adaptive deviations of the method 300 that are essentially the same as steps detailed herein.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for reporting and responding to dial-up connectivity problems comprising the steps of:
   establishing a voice connection between a caller and an automated response system;
   automatically prompting the caller for a dial-up access number that is problematic for the caller;
   automatically determining whether the received dial-up access number is valid;
   automatically reporting a potential problem to a network operations center responsible for the access number via a data connection;
   querying the network operations center via the data connection to determine whether the received dial-up number is out of service;
   responsively presenting a message to the caller via the voice connection that the access number is out of service;
   directly proceeding to the step of automatically presenting alternative dial-up numbers without prompting the caller for further information; and
   automatically presenting the caller with at least one alternative dial-up access number via the voice connection.

2. The method of claim 1, further comprising the steps of: receiving a problem response from the network operations center via the data connection; and automatically presenting the problem response in real time to the caller over the voice connection.

3. The method of claim 1, further comprising the steps of: determining a calling number using automatic number identification information; comparing an area code for the calling number with an area code of the received dial-up access number; and when area codes are different in the comparing step, prompting the caller to specify whether alternative dial-up access numbers are to be local to the calling number as opposed to the received dial-up access number, wherein the at least one automatically presented alternative dial-up access numbers are provided in accordance with a response to the prompting step.

4. The method of claim 1, further comprising the steps of: automatically determining a problem occurrence time by time stamping a time approximate to the time that the establishing step occurred; and reporting the problem occurrence time to the network operations center via the data connection.

5. The method of claim 1, further comprising the steps of: prompting the caller for problem details via the voice connection; and reporting responses specifying the problem details to the network operations center via the data connection.

6. The method of claim 5, further comprising the steps of: automatically determining a likelihood that the received dial-up access number is out of service as opposed to the caller experiencing an end user problem based upon the responses specifying the problem details; and performing at least one programmatic action based upon the likelihood.

7. The method of claim 6, further comprising the steps of: searching a historic data store for other calls by the caller; and adjusting the likelihood based upon data retrieved by the searching step.

8. The method of claim 6, the step of performing at least one programmatic action further comprising the step of: when the likelihood indicates that the caller is experiencing an end user problem, presenting the caller with troubleshooting information relating to at least one end user problem, wherein the presenting of troubleshooting information includes an option for the caller to speak with a live agent.

9. The method of claim 6, the step of performing at least one programmatic action further comprising the step of: the network control center using the likelihood to automatically initiate at least one action to correct a potential problem with the received dial-up access number.

10. The method of claim 5, said step of prompting for problem details further comprising the step of: prompting the caller as to whether the caller experienced a no-connect problem as opposed to a post-connect problem.

11. The method of claim 5, said step of prompting for problem details further comprising the steps of: prompting the caller as to whether the caller received busy signal verses a fast busy signal; and presenting an audible sample of at least one of a busy signal and a fast busy signal when prompting for a type of busy signal.

12. A machine-readable storage having stored thereon, a computer program having a plurality of code sections, said code sections executable by a machine for causing the machine to perform the steps of:
   establishing a voice connection between a caller and an automated response system;
   automatically prompting the caller for a dial-up access number that is problematic for the caller;
   automatically determining whether the received dial-up access number is valid;
   automatically reporting a potential problem to a network operations center responsible for the access number via a data connection;
   receiving a problem response from the network operations center via the data connection;
   automatically presenting the problem response in real time to the caller over the voice connection; and automatically presenting the caller with at least one alternative dial-up access number via the voice connection.

13. The machine readable storage of claim 12, further causing the machine to perform the steps of: automatically determining a likelihood that the received dial-up access number is out of service as opposed to the caller experiencing an end user problem based upon problem details provided by the caller; and performing at least one programmatic action based upon the likelihood.

14. The machine readable storage of claim 12, further causing the machine to perform the step of: presenting audible samples of at least one of a busy signal and a fast busy signal as an aid to help callers differentiate between busy signal types during an automated problem reporting process.

* * * * *